US012804760B2

(12) United States Patent
Chandramouli et al.

(10) Patent No.: US 12,804,760 B2
(45) Date of Patent: Nov. 17, 2026

(54) NON-ACCESS STRATUM SIGNALING

(71) Applicant: Nokia Technologies Oy, Espoo (FI)

(72) Inventors: Devaki Chandramouli, Plano, TX (US); Ethiraj Alwar, Bangalore (IN); Janne Veikko Kaasalainen, Söderkulla (FI); Dariusz Palka, Cracow (PL)

(73) Assignee: Nokia Technologies Oy, Espoo (FI)

( * ) Notice: Subject to any disclaimer, the term of this patent is extended or adjusted under 35 U.S.C. 154(b) by 225 days.

(21) Appl. No.: 18/888,232

(22) Filed: Sep. 18, 2024

(65) Prior Publication Data

US 2025/0098017 A1 Mar. 20, 2025

(30) Foreign Application Priority Data

Sep. 18, 2023 (IN) ............................ 202311062648

(51) Int. Cl.
*H04W 76/25* (2018.01)
*H04W 28/02* (2009.01)
*H04W 92/24* (2009.01)

(52) U.S. Cl.
CPC ....... *H04W 76/25* (2018.02); *H04W 28/0273* (2013.01); *H04W 92/24* (2013.01)

(58) Field of Classification Search
CPC .. H04W 76/25; H04W 28/0273; H04W 92/24
USPC .......................................................... 370/329
See application file for complete search history.

(56) References Cited

U.S. PATENT DOCUMENTS

2021/0259051 A1* 8/2021 Latheef ................ H04W 12/06

* cited by examiner

*Primary Examiner* — Chi Tang P Cheng
(74) *Attorney, Agent, or Firm* — Barta Jones, PLLC

(57) ABSTRACT

Example embodiments of the present disclosure relate to methods, devices, apparatuses and computer readable storage medium for distributed non-access stratum (NAS). The method comprises: providing, to a second apparatus, a NAS message transport configuration indicating at least one of a mapping between NAS services and radio bearers or a mapping between NAS services and NAS service type identifiers; and routing an NAS message between the second apparatus and a third apparatus based at least on the NAS message transport configuration, wherein the third apparatus is determined from a plurality of apparatuses based on the NAS message transport configuration.

20 Claims, 14 Drawing Sheets

NON-ACCESS STRATUM SIGNALING

FIELDS

Various example embodiments of the present disclosure generally relate to the field of telecommunication and in particular, to methods, devices, apparatuses and computer readable storage medium for non-access stratum (NAS) signaling.

BACKGROUND

In 5G new radio (NR) network, multiple radio bearers (RBs) are allocated for different protocol layer entities to ensure the efficiency of radio transmissions. There are mainly two types of RBs, i.e., data radio bearer (DRB) and signaling radio bearer (SRB). DRB is used for user plane (U-Plane) based transmissions. SRB is the RB for transmission of radio resource control (RRC) messages, Application Layer Measurement reports, and/or NAS messages. In particular, RRC messages may be transported via SRB0, SRB1 or SRB3. The Application Layer Measurement report may be transported via SRB 4. The NAS messages may be transported by using a common SRB, e.g., SRB1 or SRB2. This is sufficient in 5G network, since access and mobility management function (AMF) acts as a single-entry point to 5G core (5GC) for all the NAS messages.

NAS terminations are discussed for 6G network framework, which may involve direct communications among different network functions in 6G core network (6GCN). Thus, there is a need for improving the routing of NAS messages to an appropriate network function.

SUMMARY

In a first aspect of the present disclosure, there is provided a first apparatus. The first apparatus comprises at least one processor; and at least one memory storing instructions that, when executed by the at least one processor, cause the first apparatus at least to: provide, to a second apparatus, a NAS message transport configuration indicating at least one of a mapping between NAS services and radio bearers or a mapping between NAS services and NAS service type identifiers; and route an NAS message between the second apparatus and a third apparatus based at least on the NAS message transport configuration, wherein the third apparatus is determined from a plurality of apparatuses based on the NAS message transport configuration.

In a second aspect of the present disclosure, there is provided a second apparatus. The second apparatus comprises at least one processor; and at least one memory storing instructions that, when executed by the at least one processor, cause the second apparatus at least to: obtain, from a first apparatus, a NAS message transport configuration indicating a mapping between NAS services and radio bearers or between NAS services and NAS service type identifiers; and perform an NAS message transport between the second apparatus and a third apparatus via the first apparatus based at least on the NAS message transport configuration.

In a third aspect of the present disclosure, there is provided a method. The method comprises: providing, to a second apparatus, a NAS message transport configuration indicating at least one of a mapping between NAS services and radio bearers or a mapping between NAS services and NAS service type identifiers; and routing an NAS message between the second apparatus and a third apparatus based at least on the NAS message transport configuration, wherein the third apparatus is determined from a plurality of apparatuses based on the NAS message transport configuration.

In a fourth aspect of the present disclosure, there is provided a method. The method comprises: obtaining, from a first apparatus, a NAS message transport configuration indicating a mapping between NAS services and radio bearers or between NAS services and NAS service type identifiers; and performing an NAS message transport between the second apparatus and a third apparatus via the first apparatus based at least on the NAS message transport configuration.

In a fifth aspect of the present disclosure, there is provided a first apparatus. The first apparatus comprises means for providing, to a second apparatus, a NAS message transport configuration indicating at least one of a mapping between NAS services and radio bearers or a mapping between NAS services and NAS service type identifiers; and means for routing an NAS message between the second apparatus and a third apparatus based at least on the NAS message transport configuration, wherein the third apparatus is determined from a plurality of apparatuses based on the NAS message transport configuration.

In a sixth aspect of the present disclosure, there is provided a second apparatus. The second apparatus comprises means for obtaining, from a first apparatus, a NAS message transport configuration indicating a mapping between NAS services and radio bearers or between NAS services and NAS service type identifiers; and means for performing an NAS message transport between the second apparatus and a third apparatus via the first apparatus based at least on the NAS message transport configuration.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
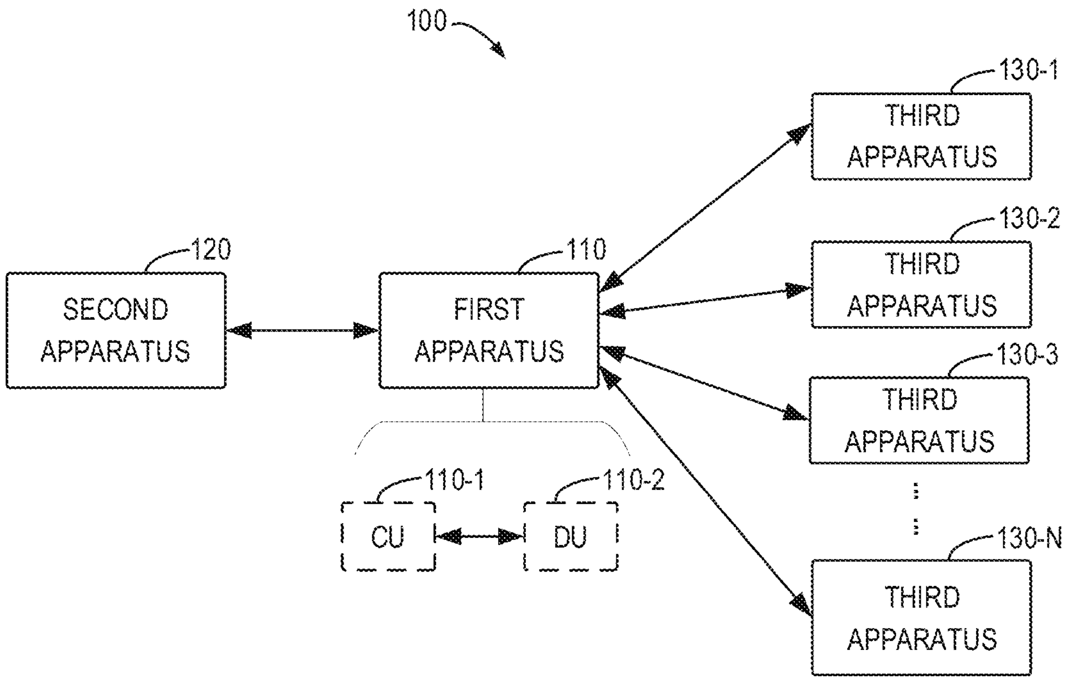
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As used herein, the term "network function (NF)" may refer to individual components or services for control plane (C-Plane) or user plane (U-plane) in the core network (CN). Each of the network functions may be considered as a logical network element that is independent and autonomous. As a result, addition, updating, expanding and/or removal of a network function would not affect other network functions in CN. The network functions may communicate with each other via respective interfaces.

5G network supports the following SRBs:

SRB0 is for transmission of RRC messages by using common control channel (CCCH).

SRB 1 is for RRC messages, which may include a piggybacked NAS message, as well as for NAS messages prior to the establishment of SRB2, by using dedicated control channel (DCCH).

SRB2 is for NAS and RRC messages which include logged measurement information by using DCCH. SRB2 may have a lower priority than SRB1 and may be configured by the network after AS security activation.

SRB3 is for specific RRC messages when UE is in E-UTRAN New Radio Dual Connectivity (EN-DC), (NG)EN-DC, New Radio E-UTRA Dual Connectivity (NE-DC) or NR-DC by using DCCH.

SRB4 is for RRC messages which include application layer measurement report information by using DCCH. SRB4 may have a lower priority than SRB1 and can only be configured by the network after AS security activation.

As previously mentioned, it is expected to implement distributed or multiple NAS terminations in 6G network framework. As an example arrangement, the radio access network (RAN) may forward NAS messages between multiple UEs and NAS entities. Such a direct routing relies on decoding the NAS payload in the existing network framework. However, this approach not only blurs the RAN/Core domain boundaries, but also exposes NAS protocol to RAN and may incur additional processing overhead.

The present disclosure provides a solution for enabling efficient routing of NAS messages to appropriate network functions in CN. In this solution, the RAN device provides to the UE a NAS message transport configuration. The NAS message transport configuration may indicate a mapping between NAS services and radio bearers and/or a mapping between NAS services and NAS service type identifiers. Based on the NAS message transport configuration, the RAN device may route the NAS message between the UE and a corresponding NF or a corresponding NAS entity. The corresponding NF or the corresponding NAS entity may be determined based on the NAS message transport configuration.

Example embodiments of the present disclosure will be described in detail below with reference to the accompanying drawings.

FIG. 1 illustrates an example communication environment 100 in which example embodiments of the present disclosure can be implemented. The communication environment 100 may support distributed NAS termination. In some cases, the communication environment 100 may deploy a service-based architecture.

The communication environment 100 may involve both RAN and CN domains, as well as the RAN-CN interface. As shown in FIG. 1, the communication environment 100 comprises a first apparatus 110, a second apparatus 120 and a plurality of third apparatuses 130-1 to 130-N, which may communicate with each other.

The first apparatus 110 may be a network device in RAN, for example, a gNB. In some example embodiments, the first apparatus 110 may be implemented as discrete components, either logically or physically. In the example shown in FIG. 1, the first apparatus 110 may further comprise a centralized unit (CU) 110-1 and a distributed unit (DU) 110-2. The CU 110-1 may be divided into CU-CP and CU-UP. In particular, CU-CP may be connected to DU 110-2 via F1-C interface, while CU-UP may be connected to DU 110-2 via F1-U interface. It should be understood that the single DU is shown for illustrative purpose, and in some other embodiments, the first apparatus 110 may include more than one DU. Thus, the present disclosure is not limited in this regard.

The first apparatus 110 may provide a radio coverage for the second apparatus 120. The second apparatus 120 may be a terminal device, for example, UE. The plurality of third apparatuses 130-1 to 130-N (which may be collectively referred to as the third apparatus 130 hereinafter) may be multiple network functions in CN and/or NAS entities.

In some example embodiments, the second apparatus 120 may require multiple NAS services, such as positioning and so on, which are associated with the plurality of third apparatuses 130-1 to 130-N. Accordingly, corresponding NAS signaling connections are setup for routing NAS messages for these NAS services from the second apparatus 120 to respective third apparatuses 130-1 to 130-N via the first apparatus 110. To enable the NAS routing between the second apparatus 120 and an appropriate third apparatus 130, the first apparatus 110 may provide the NAS message transport configuration to the second apparatus 120, which will be discussed in detail later. In an embodiment, the transport configuration may be preconfigured in the first apparatus 110 and in the second apparatus 120.

In some example embodiments, a link from the first apparatus 110 to the second apparatus 120 is referred to as a downlink (DL), and a link from the second apparatus 120 to the first apparatus 110 is referred to as an uplink (UL). In DL, the first apparatus 110 is a transmitting (TX) device (or a transmitter) and the second apparatus 120 is a receiving (RX) device (or a receiver). In UL, the second apparatus 120 is a TX device (or a transmitter) and the first apparatus 110 is a RX device (or a receiver).

In some example embodiments, operations described in connection with a terminal device may be implemented at a network device or other device, and operations described in connection with a network device may be implemented at a terminal device or other device.

It is to be understood that the number of devices and their connections shown in FIG. 1 are only for the purpose of illustration without suggesting any limitation. The communication network 100 may include any suitable number of apparatuses configured to implementing example embodiments of the present disclosure. Although not shown, it would be appreciated that one or more additional apparatuses and connections may be deployed in the communication network 100.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 2:
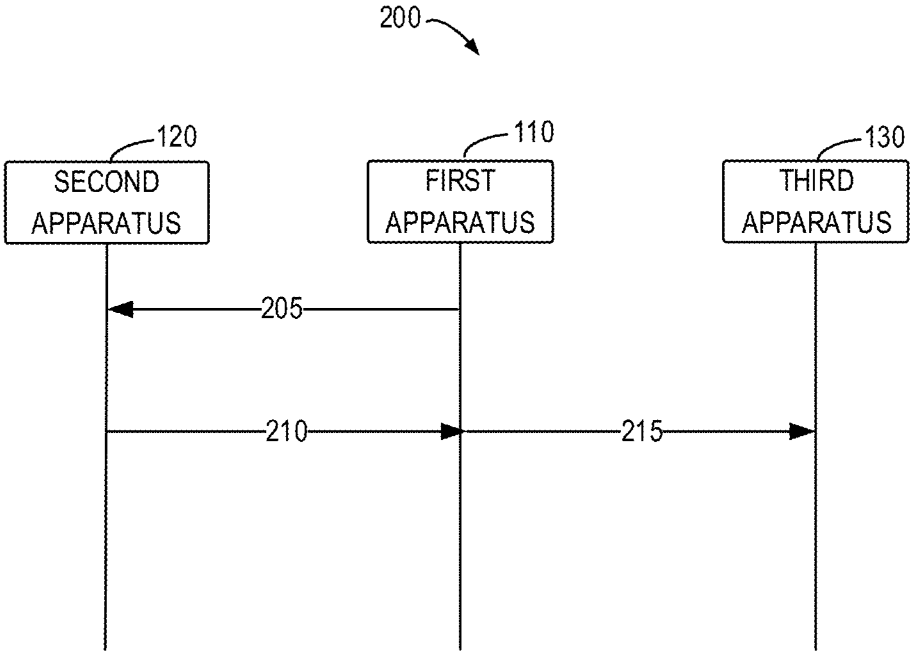
FIG. 2 illustrates a signaling chart for an example routing process of NAS messages according to some example embodiments of the present disclosure.

Reference is now made to FIG. 2, which illustrates a signaling chart for an example routing process 200 according to some example embodiments of the present disclosure. As shown in FIG. 2, the routing process 200 involves at least the first apparatus 110, the second apparatus 120, and the third apparatus 130. For the purpose of discussion, reference is also made to FIG. 1 to describe the routing process 200.

In the routing process 200, the first apparatus 110 provides (205) a NAS message transport configuration to the second apparatus 120.

The first apparatus 110 then routes the NAS message between the second apparatus 120 and a third apparatus 130 based at least on the NAS message transport configuration.

As shown in FIG. 2, the second apparatus 120 transmits (210) the NAS message to the first apparatus 110. For example, upon receiving the NAS message from the second apparatus 120, the second apparatus 120 may determine, based on the NAS message transport configuration and information about the NAS message, a destination (an appropriate third apparatus 130) to which the NAS message is to be routed. Then the first apparatus 110 forwards (215) the NAS message to the appropriate third apparatus 130 based on the NAS message transport configuration. For a DL NAS message. i.e., transmitted from the third apparatus 130, the first apparatus may perform a similar operation.

In the following, various implementations of the NAS message transport configuration will be described in connection with FIG. 3 to FIG. 13.

In some example embodiments, dedicated SRBs may be defined per NAS service. Moreover, associated configurations related to air interface protocol stacks (e.g., PHY, MAC, RLC, PDCP and so on) may be required. That is, dedicated SRBs may be introduced for NAS-based communications between the terminal devices and network functions.

In this case, the NAS message transport configuration may indicate a mapping between NAS services (or NAS service types) and respective dedicated SRBs. By way of example, logical channel IDs may be used for identifying dedicated SRBs. The first apparatus 110 may allocate logical channel IDs for the respective dedicated SRBs. In some cases, this may need to increase a maximum value of the range of logical channel IDs. Additionally, in some example embodiments, different priorities may be associated to the respective SRBs. For example, respective SRBs may be associated to different priorities of NAS messages that their traffic/service types belong to.

The existing SRBs may be used in combination with the dedicated SRBs. For example, SRB1 and/or SRB2 may be used for exchanging NAS messages till the dedicated SRB is configured.

The first apparatus 110 may configure the dedicated SRBs either before or after access stratum (AS) Security for specific network functions. In some example embodiments, after configuring the SRB1, AS Security and SRB2, the first apparatus 110 may configure dedicated SRBs on demand. In some other embodiments, after configuring the SRB1 and AS Security, the first apparatus 110 may configure dedicated SRBs on demand. In addition to on-demand setup of the dedicated SRB, the dedicated SRBs may be released on-demand.

In some example embodiments, the dedicated SRBs may be configured on-demand per UE. In particular, depending on the UE type and/or required NAS service(s), only specific SRBs may be configured. For illustrative purpose, in the example shown in FIG. 3, SRBc may correspond to the positioning service. If the second apparatus 120 does not require positioning service, then the SRBc may not be configured.

Figure 3:
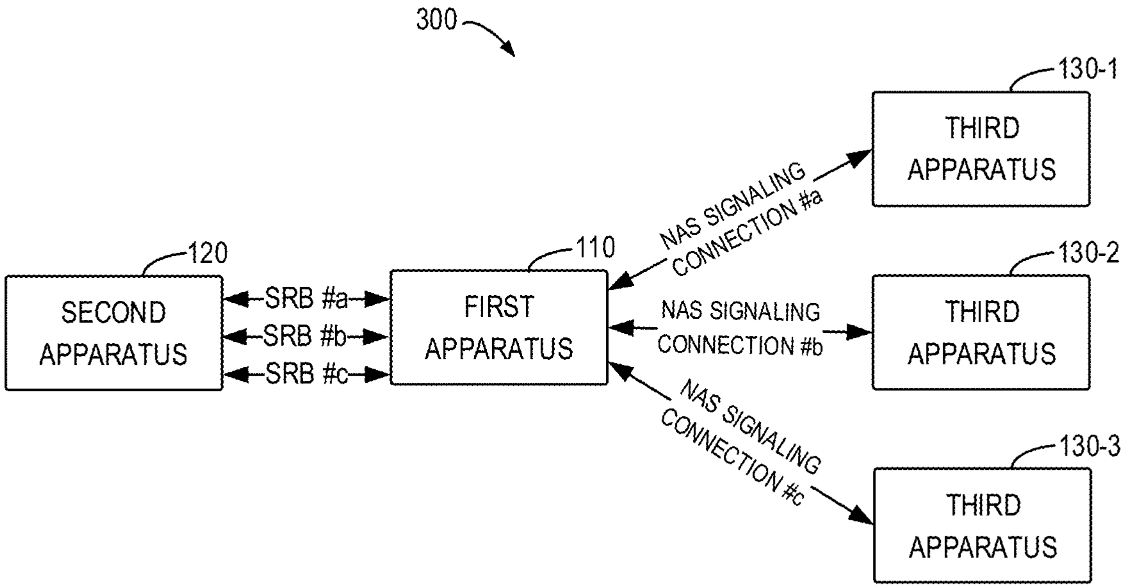
FIG. 3 illustrates a schematic diagram of an example NAS message transport configuration according to some example embodiments of the present disclosure.

FIG. 3 illustrates a schematic diagram of an example NAS message transport configuration 300 according to some example embodiments of the present disclosure. In the example shown in FIG. 3, the second apparatus 120 requires three NAS services provided by the third apparatus 130-1 to 130-3, which may correspond to different SRBs carrying the NAS messages.

To this end, the first apparatus 110 may configure the mapping between the NAS services and respective dedicated SRBs to the second apparatus 120, e.g., SRB #a corresponds to NAS service #a, SRB #b corresponds to NAS service #b, and SRB #c corresponds to NAS service #c. Based on the mapping, the first apparatus 110 may transmit the NAS message of a specific NAS service via a corresponding dedicated SRB. For example, the first apparatus 110 may transmit, to the second apparatus, the NAS message of the NAS service #a via the SRB #a, transmit the NAS message of the NAS service #b via the SRB #b, and transmit the NAS message of the NAS service #c via the SRB #c.

Upon receiving the NAS messages, the first apparatus 110 may determine the NAS services corresponding to the NAS messages based on the mapping and the SRBs carrying the NAS messages. This is because the first apparatus 110 is also aware of the NAS transport configuration. In this situation, the NAS signaling connections #a to #c e.g., associated with NAS services #a to #c, are setup between the first apparatus 110 and the third apparatus 130-1 to 130-3, respectively. Consequently, the first apparatus 110 then may route each of the NAS messages to an appropriate third apparatus 130, e.g., an appropriate NF or NAS entity, associated with a corresponding determined NAS service.

In this way, the first apparatus 110 may associate dedicated SRBs #a to #c to corresponding NAS signaling connections #a to #c for the indicated NAS services. It is to be understood that the first apparatus 110 may perform similar operations for the DL NAS message transport.

Figure 4:
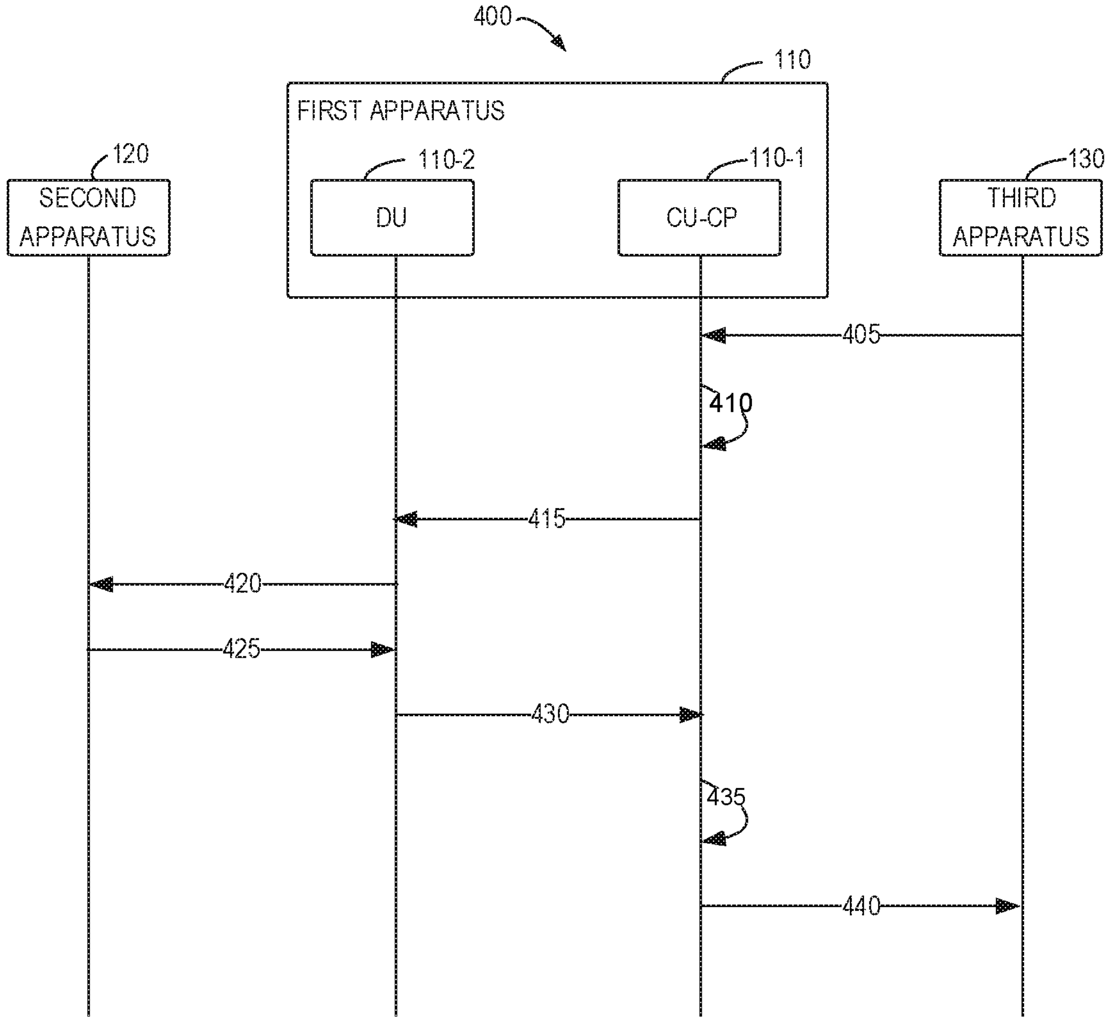
FIG. 4 illustrates a signaling chart for an example routing process of NAS messages according to some example embodiments of the present disclosure.

FIG. 4 illustrates a signaling chart for an example routing process 400 of NAS messages according to some example embodiments of the present disclosure. The routing process 400 may be based on the NAS message transport configuration that indicates the mapping between NAS message types and respective dedicated SRBs. For the purpose of discussion, reference is also made to FIG. 1 to describe the routing process 400.

To initiate the process 400, the third apparatus 130 may transmit (405) a DL NAS transport message to the CU 110-1 in the first apparatus 110 via NGAP protocol.

The CU 110-1 may determine (410) a mapping between SRBs used for NAS message transport over RRC interface and network functions. For example, the SRBs may be identified by respective SRB identifiers (IDs).

In some example embodiments, the NAS message transport configuration that indicates the mapping between NAS services and respective SRBs may be statically configured. In this case, all the terminal devices served by the first apparatus 110 may be configured with the same mapping between respective SRBs and NAS signaling connections in the RRC setup procedure. By way of example, a mapping table of an SRB ID to NF associated with a NAS service may be used for such statics NAS message transport configuration.

Additionally, or alternatively, in some example embodiments, the NAS message transport configuration that indicates the mapping between NAS services and respective SRBs may be configured on demand. For example, the second apparatus 120 may transmit an indication of one or more NAS services to be required by the second apparatus 120 in a RRC setup procedure or in a RRC message after the RRC setup has been completed (e.g., in RRC_CONNECTED mode). The first apparatus 110 may configure the mapping between the NAS services and respective dedicated SRBs based on the indication. In this way, dynamic NAS message transport configurations are supported, and the RAN only configures dedicated SRBs for those required NAS services.

The CU 110-1 may provide (415) information about the mapping between NAS services and the respective SRB IDs to the DU 110-2. The information about the respective SRB IDs may be carried in, for example, DL RRC message via F1AP protocol.

Accordingly, the DU 110-2 in the first apparatus 110 may forward (420) the information about the mapping between NAS services and the respective SRB IDs to the second apparatus 120. For example, the information about the respective SRB IDs may be carried in a RRC message.

The second apparatus 120 may then perform the NAS message transport with the third apparatus 130 via the first apparatus 110 based on the information about the mapping between NAS services and the respective SRB IDs. In the example of FIG. 4, which shows a UL communication scenario, the second apparatus 120 transmits (425) a NAS message via a dedicated SRB with an SRB ID corresponding to a NAS service to the DU 110-2.

Accordingly, the DU 110-2 forwards (430) the NAS message to the CU 110-1. The CU 110-1 may determine (435) a NAS service corresponding to the dedicated SRB. For example, the CU 110-1 may determine a corresponding network function based on the SRB ID of the dedicated SBR by looking up the mapping table of an SRB ID to NF associated with a NAS service.

After determining the network function and/or the associated NAS entity, the CU 110-1 may transmit (440) the NAS message to the determined NF or NAS entity (i.e., the third apparatus 130) via the corresponding NAS signaling connection.

In DL communications, the first apparatus 110 may receive the DL NAS message associated with a NAS service from the third apparatus 130. The first apparatus 110 may determine a dedicated SRB corresponding to a NAS service. In case of static NAS message transport configuration, this may be done by, for example, looking up the mapping table of an SRB ID to NF associated with a NAS service. After determining the dedicated SRB, the first apparatus 110 may transmit the DL NAS message to the second apparatus 120 via the determined dedicated SRB.

In some other embodiments, the first apparatus 110 may configure the second apparatus 120 with a mapping between NAS message type identifiers and NAS services. The second apparatus 120 may send the NAS messages including NAS message type identifier in addition. Then the first apparatus 110 may route the NAS message over a dedicated NAS signaling connection to an appropriate 6G NF or NAS entity associated with a NAS service corresponding to the NAS message type identifier.

Figure 5:
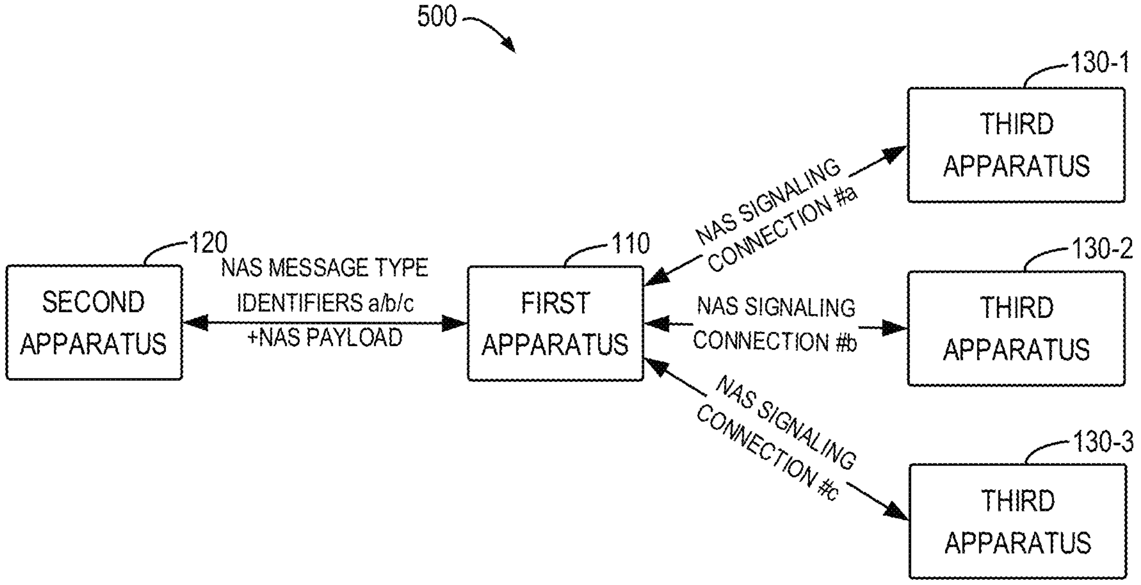
FIG. 5 illustrates a schematic diagram of an example NAS message transport configuration according to some example embodiments of the present disclosure.

FIG. 5 illustrates a schematic diagram of an example NAS message transport configuration 500 according to some example embodiments of the present disclosure. In the example shown in FIG. 5, the second apparatus 120 requires three NAS services provided by the third apparatus 130-1 to 130-3, which may correspond to different NAS message type identifiers. The identifier may be included in a header of the NAS message, for example as an RRC header or as an NDAP header (explained later).

Additionally or optionally, a set ID/pointer to identify the specific NF instance may be configured along with the NAS service type identifier for the RRC UL information transfer message from the second apparatus 120 in a RRC connected mode, so that the first apparatus 110 may route the NAS message to appropriate 6G NF.

To this end, the first apparatus 110 may configure the mapping between the NAS services and respective NAS message type identifiers to the second apparatus 120, e.g., NAS message type identifier #a corresponds to NAS service #a, NAS message type identifier #b corresponds to NAS service #b, and NAS message type identifier #c corresponds to NAS service #c. This configuration may be carried in the NAS transport configuration. Based on the mapping, the first apparatus 110 may transmit the NAS message including a corresponding NAS message type identifier and NAS payload to the second apparatus 120. For example, the first apparatus 110 may transmit NAS messages each including a corresponding NAS message type identifier #a #b or #c respectively.

Upon receiving the NAS messages, the first apparatus 110 may determine the NAS services corresponding to the NAS messages based on the mapping and the NAS message type identifiers. In this situation, the NAS signaling connections #a to #c e.g., associated with NAS services #a to #c, are setup between the first apparatus 110 and the third apparatus 130-1 to 130-3, respectively. Consequently, the first apparatus 110 then may route each of the NAS messages to the appropriate NF or the NAS entity associated with a corresponding determined NAS service. In this way, the first apparatus 110 may associate the NAS message type identifiers #a to #c to corresponding NAS signaling connections #a to #c for the indicated NAS services.

Figure 6:
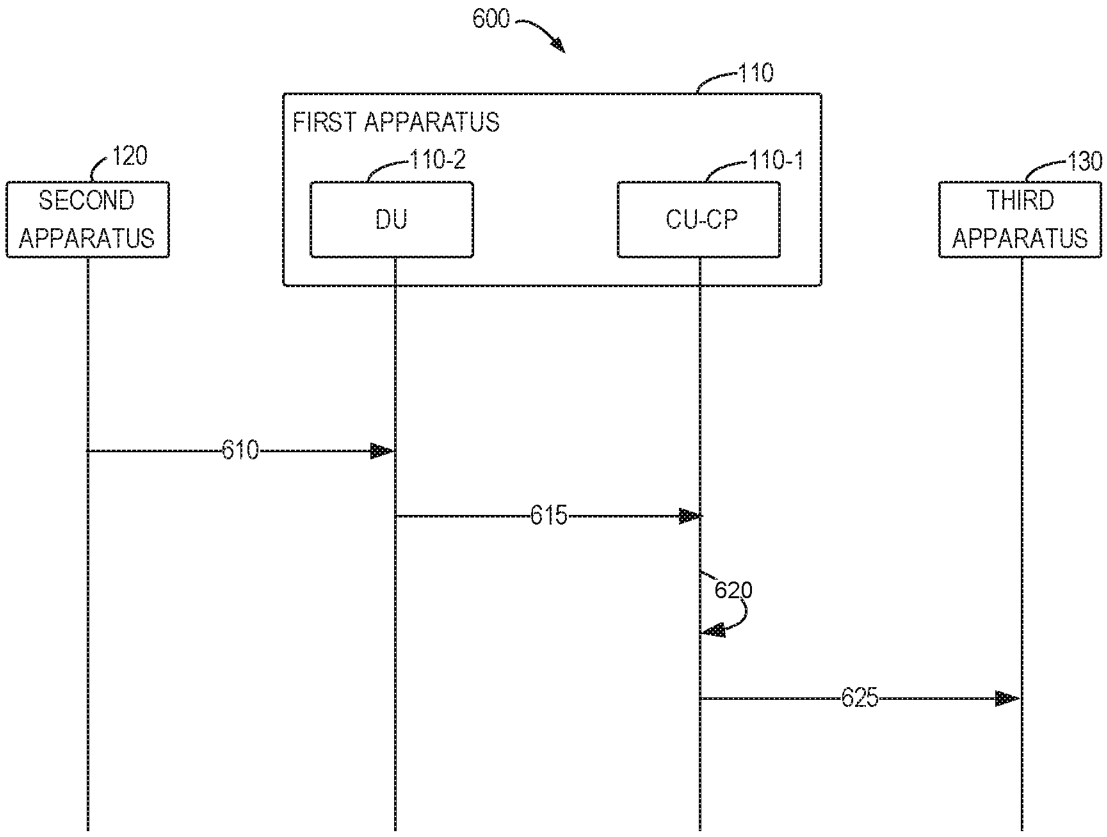
FIG. 6 illustrates a signaling chart for an example routing process of NAS messages according to some example embodiments of the present disclosure.

FIG. 6 illustrates a signaling chart for an example routing process 600 of NAS messages according to some example embodiments of the present disclosure. The routing process 600 may be based on the NAS message transport configuration that indicates the mapping between NAS message type identifiers and respective NAS services. For the purpose of discussion, reference is also made to FIG. 1 to describe the routing process 600.

In the process 600, the NAS message type identifier may be introduced for each NAS based communication, i.e., the NAS message transport between the second apparatus 120 and the corresponding third apparatus 130.

The NAS message identifier can either be standardized (fully static), preconfigured in the second apparatus 120 and the first apparatus 110 or dynamically agreed when the first NAS connection is established. If it is dynamically determined, then this may be provided to the first apparatus 110 over NGAP.

As shown in FIG. 6, the second apparatus 110 may transmit (610) an NAS message, e.g., an RRC UL Information Transfer message, to DU 110-2 in the first apparatus 110. The NAS message may include the NAS message type identifier along with the NAS payload. DU 110-2 may forward (615) the NAS message including the NAS message type identifier along with the NAS payload to the CU 110-1 in the first apparatus 110.

Based on the NAS message type identifier, the CU 110-1 may determine (620) the NAS service corresponding to the NAS message type identifier. For example, the CU 110-1 may determine a corresponding network function based on the NAS message type identifier by looking up the mapping table of NAS message type identifiers to NAS services.

After determining the network function and/or the associated NAS entity, the CU 110-1 may transmit (625) the NAS message to the determined NAS entity (i.e., the third apparatus 130) via the corresponding NAS signaling connection.

In some further embodiments, the first apparatus 110 may configure the second apparatus 120 with a mapping between the NAS services and respective dedicated DRBs to the second apparatus 120.

Furthermore, a mapping between respective dedicated DRBs and F1-U tunnels may be used to transport the NAS message to the destination NF.

Figure 7:
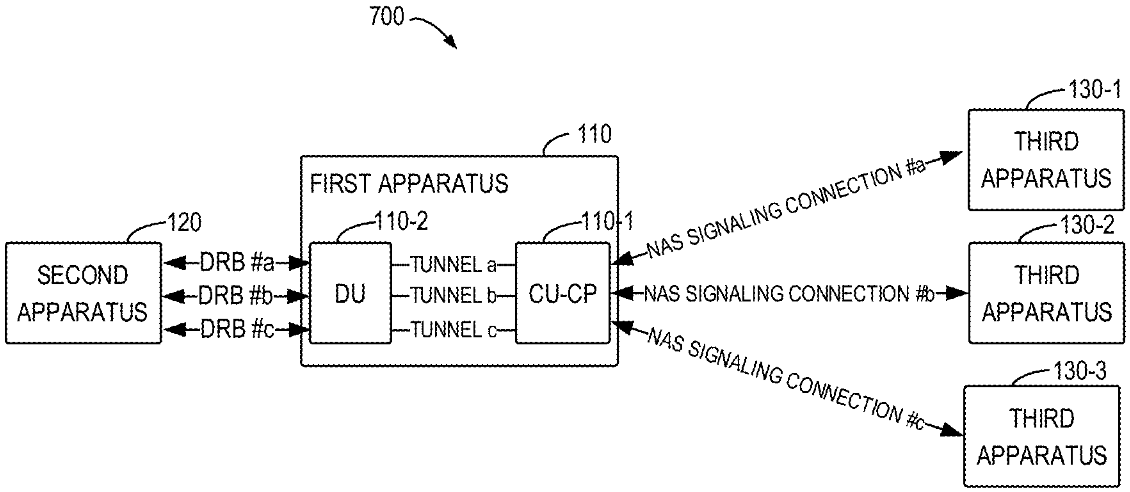
FIG. 7 illustrates a schematic diagram of an example NAS message transport configuration according to some example embodiments of the present disclosure.

FIG. 7 illustrates a schematic diagram of an example NAS message transport configuration 700 according to some example embodiments of the present disclosure. In the example shown in FIG. 7, the second apparatus 120 requires three NAS services provided by the third apparatus 130-1 to 130-3, which may correspond to different SRBs carrying the NAS messages.

As shown, the first apparatus 110 may configure the mapping between the NAS services and respective dedicated DRBs to the second apparatus 120, e.g., DRB #a corresponds to NAS service #a, DRB #b corresponds to NAS service #b, and DRB #c corresponds to NAS service #c. Based on the mapping, the first apparatus 110 may transmit the NAS message of a specific NAS service via a corresponding dedicated DRB. For example, the first apparatus 110 may transmit, to the DU 110-2 in the first apparatus 110, the NAS message of the NAS service #a via the DRB #a, transmit the NAS message of the NAS service #b via the DRB #b, and transmit the NAS message of the NAS service #c via the DRB #c.

Upon receiving the NAS messages, by using the mapping between respective dedicated DRBs and F1-U tunnels, the DU 110-2 may forward the each of the NAS messages via a corresponding F1-U tunnel to the CU 110-1 in the first apparatus 110. Then The CU 110-1 may determine the NAS services corresponding to F1-U tunnels based on the mapping. In this situation, the NAS signaling connections #a to #c e.g., associated with NAS services #a to #c, are setup between the first apparatus 110 and the third apparatus 130-1 to 130-3, respectively. Consequently, the first apparatus 110 then may route each of the NAS messages to the appropriate NF or the NAS entity associated with a corresponding determined NAS service. In this way, the first apparatus 110 may associate the dedicated DRBs #a to #c to corresponding NAS signaling connections #a to #c for the indicated NAS services. It is to be understood that the first apparatus 110 may perform similar operations for the DL NAS message transport.

Figure 8A:
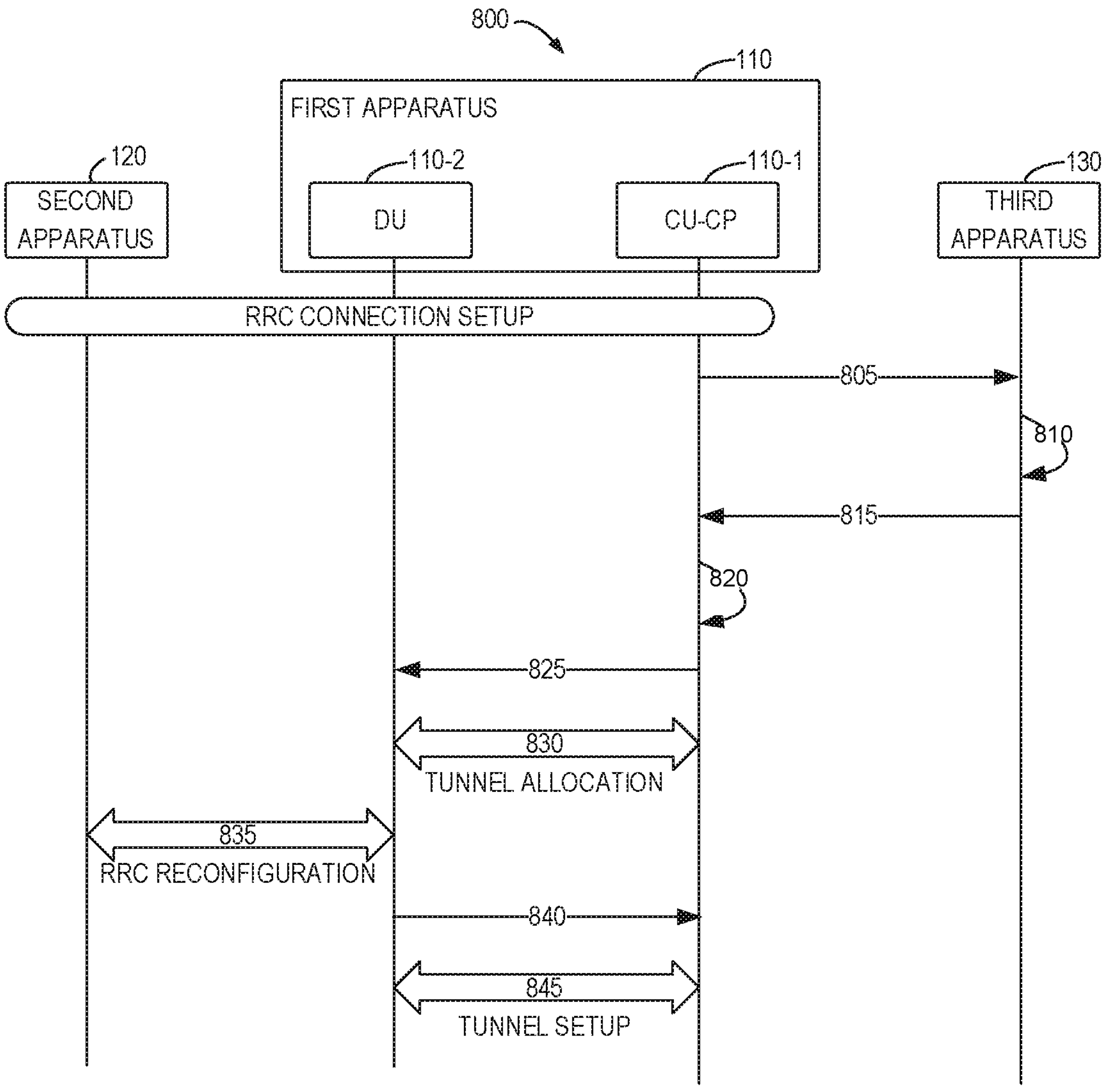
FIG. 8A illustrates a signaling chart for an example routing process of NAS messages according to some example embodiments of the present disclosure.
Figure 8B:
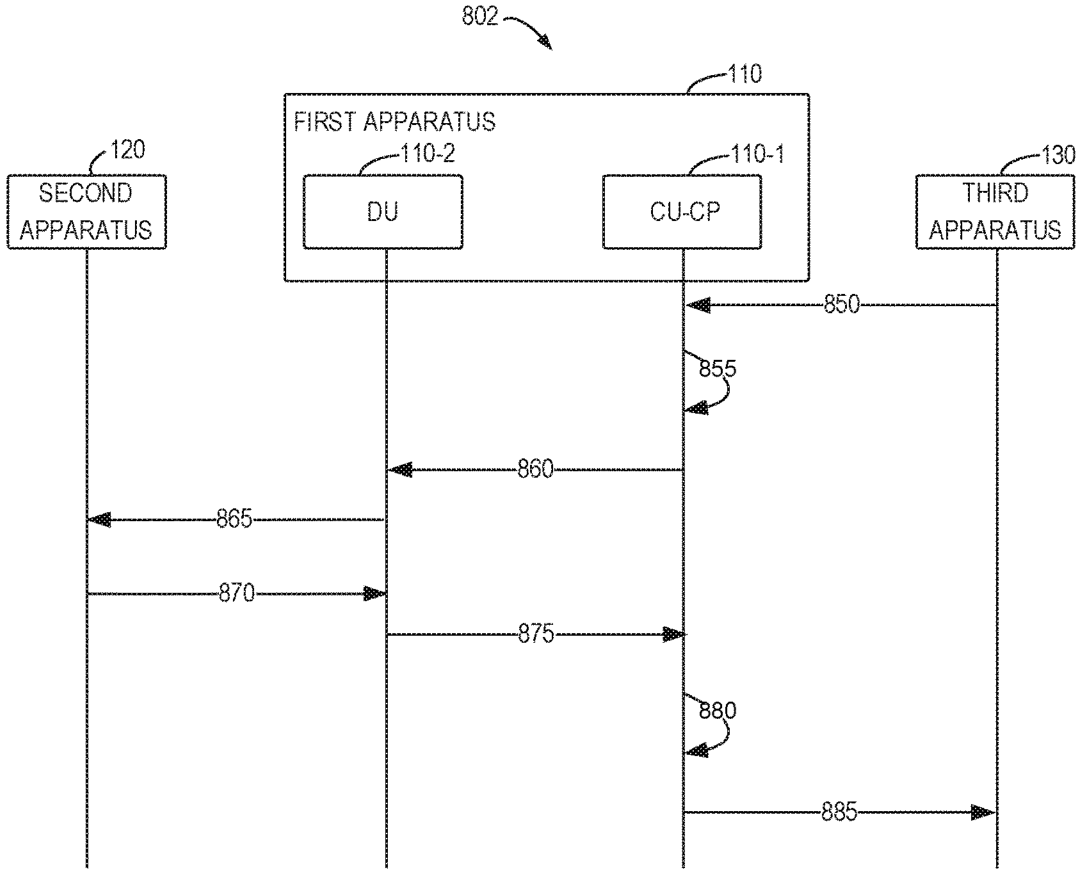
FIG. 8B illustrates a signaling chart for an example routing process of NAS messages according to some example embodiments of the present disclosure.

FIGS. 8A and 8B illustrate signaling charts for example routing processes 800 and 802 of NAS messages according to some example embodiments of the present disclosure. The routing processes 800 and 802 may be based on the NAS message transport configuration that indicates the mapping between NAS services and respective dedicated DRBs. For the purpose of discussion, reference is also made to FIG. 1 to describe the routing process processes 800 and 802.

As shown in FIG. 8A, after an RRC connection Setup has been completed, the first apparatus 110, e.g., the CU 110-1, transmits (805) to the third apparatus 130 a E1AP message, e.g., a Bearer Context Setup Request, including an indication of NAS service type. Then the mapping between the F1-U Tunnel and the NAS service, i.e., the NAS signaling connection may be established (810) at the third apparatus 130. It is to be understood that the mapping between the F1-U Tunnel and the NAS service may be indicated by look-up table and the mapping may be static or dynamic established.

Then the third apparatus 130 transmit the tunnel endpoints for the NFs associated with the corresponding NAS services to the CU 110-1 via e.g., a Bearer Context Setup Response. The CU 110-1 encodes (820) the RRC reconfiguration message and transmits (825), via a F1AP message, e.g., a UE Context Modification Request to the DU 110-2 indicating the NAS type and corresponding RRC container. A Tunnel allocation may be performed (830) between the DU 110-2 and the CU 110-1.

Then the DU 110-2 may transmit (835) to the second apparatus 120 the RRC reconfiguration message, i.e., indicating the configured mapping between the NAS services and the respective dedicated DRBs. After that, the DU 110-2 may transmit (840), via a F1AP message, e.g., a UE Context Modification Response to the CU 110-1 indicating the RRC reconfiguration has been completed. Then the dedicated F1-U tunnel setup for NAS message transport can be done (845) between the CU 110-1 and DU 110-2.

As shown in FIG. 8B, for a DL NAS message transport, in response to receiving (850) a DL NAS message from the third apparatus 130, the CU 110-1 may determine (855) the F1-U tunnel for routing the DL NAS message based on the NAS service associated with the DL NAS message/NF and the mapping between the NAS services and the F1-U tunnels.

Then the CU 110 forwards (860) the DL NAS message via the determined F1-U tunnel to the DU 110-2. By using the mapping between the F1-U tunnels and the respective dedicated DRBs, the DU 110-2 may transmit (865) the DL NAS message via a dedicated DRB corresponding to the determined F1-U tunnel to the second apparatus 120.

For a DL NAS message transport, the second apparatus 120 may transmit (870) a UL NAS message via a dedicated DRB to the DU 110-2. By using the mapping between the F1-U tunnels and the respective dedicated DRBs, the DU 110-2 may determine a F1-U tunnel corresponding to the dedicated DRB and forward (875) the UL NAS message to the CU 110-1 via the determined F1-U tunnel.

Then the CU 110-1 may determine (880) a NAS service corresponding to the F1-U tunnel and transmit (885) the UL NAS message to the third apparatus 130 associated with the NAS service or capable of providing the NAS service. In this way, RAN device can route the NAS message over the dedicated NAS Signaling connection between the UE and the appropriate NAS entity.

In some still further embodiments, a new layer in the radio protocol stack may be introduced for UE and RAN, which may be called as new NAS Data Adaptation Protocol (NDAP). The NDAP may be introduced for the NAS message routing/transport, which may allow to route NAS messages to/from certain NAS termination entity in the network.

Figure 9A:
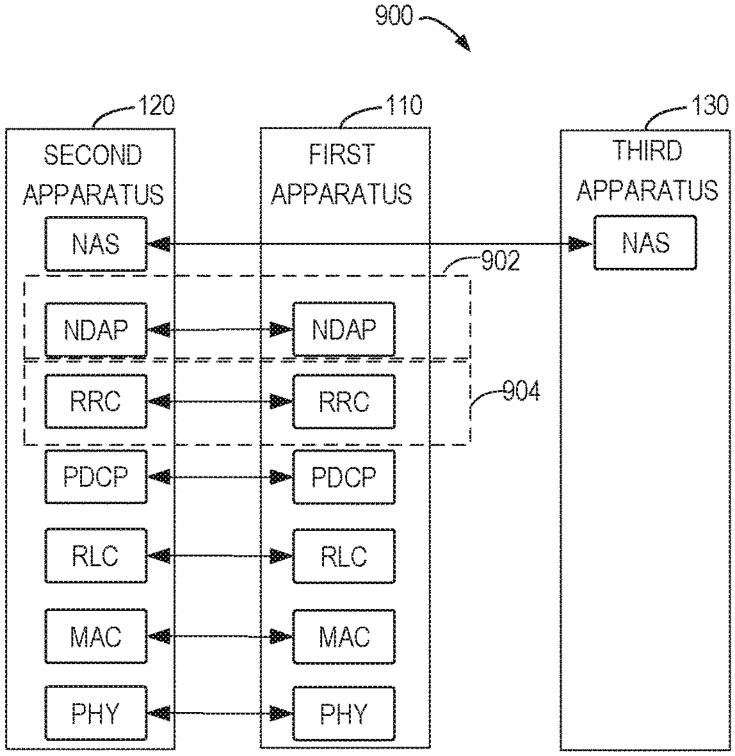
FIG. 9A illustrates a schematic diagram of an example NAS message transport configuration according to some example embodiments of the present disclosure.
Figure 9B:
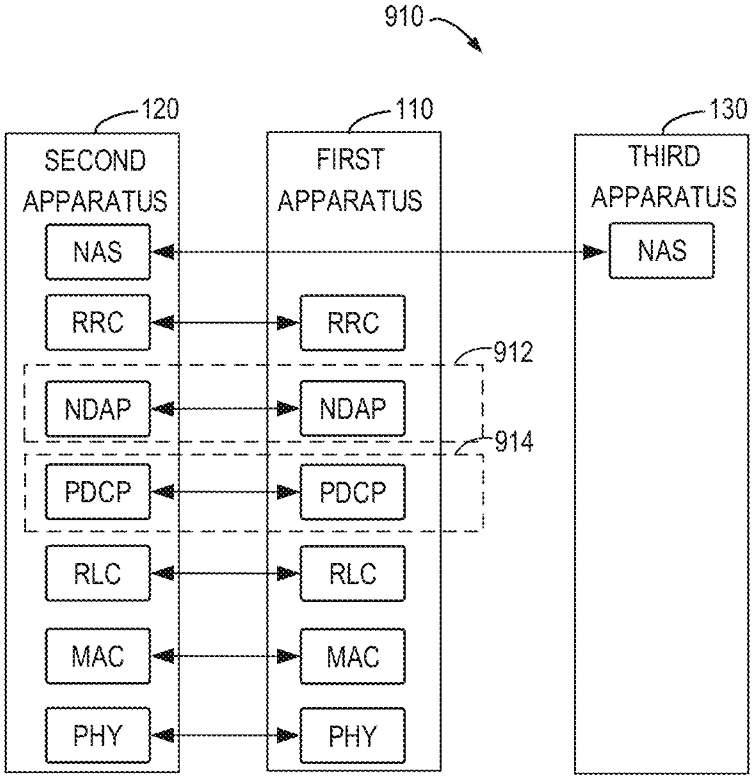
FIG. 9B illustrates a schematic diagram of an example NAS message transport configuration according to some example embodiments of the present disclosure.

In some embodiments, the NDAP layer may a higher layer for RRC (assuming that NAS messaging is still sent using RRC containers) or other layers (e.g., PDCP-U, PDCP-C). As shown in FIG. 9A, in the radio protocol stack 900, the introduced NDAP layer 902 may be a higher layer for RRC layer 904. As shown in FIG. 9B, the introduced NDAP layer 912 may be a higher layer for the PDCP layer 914.

In some embodiments, the introduced NDAP layer may make multi-point connectivity between RAN and CN transparent for RRC or other layer used for NAS messaging (e.g., PDCP-U, PDCP-C).

Furthermore, for the introduced NDAP layer, a new NDAP protocol data unit (PDU) is introduced correspondingly, which may include a NDAP PDU header ciphered/integrity-protected at RAN level only.

In this case, a mapping between NAS entities (e.g., which may be equal to/corresponding to respective NAS services) and NAS Service Flows (NSFs) (e.g., which may be equal to/corresponding to NAS service types) may be configured. For example, the NSF ID (e.g., which may be equal to/corresponding to NAS service type identifiers) is an integer value which allows to identify NAS entity at CN in a unique way. The range of NSF IDs may be standardized and cannot be changed. The range may impact the length of NDAP PDU header.

Figure 10:
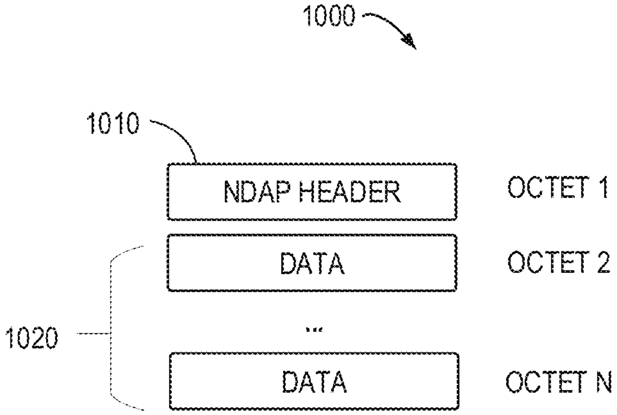
FIG. 10 illustrates a schematic diagram of an example NAS Data Adaptation Protocol (NDAP) PDU according to some example embodiments of the present disclosure.
Figure 11A:
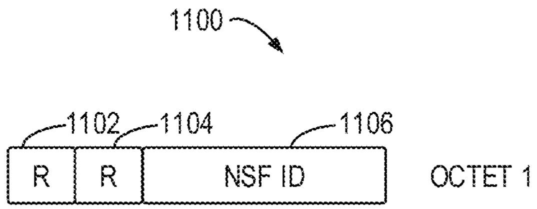
FIG. 11A illustrates a schematic diagram of an example NDAP PDU header structure according to some example embodiments of the present disclosure.
Figure 11B:
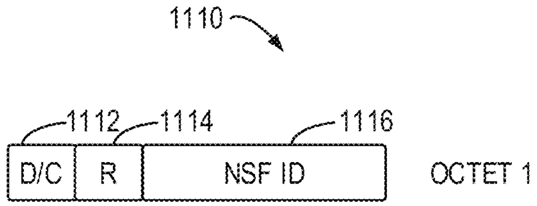
FIG. 11B illustrates a schematic diagram of an example NDAP PDU header structure according to some example embodiments of the present disclosure.
Figure 11C:
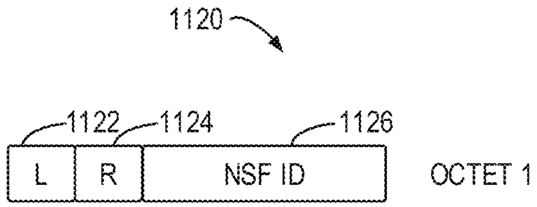
FIG. 11C illustrates a schematic diagram of an example NDAP PDU header structure according to some example embodiments of the present disclosure.

As shown in FIG. 10, in a NDAP PDU 1000, the NDAP header 1010 may be presented as 1-octet. The NDAP PDU 1000 may also include data 1020, i.e., NAS message payload. However, as described above, the length of NDAP PDU header may be depends on the range of NSF IDs. The NDAP PDU header is expected to contain at least NSF ID. However, it can also contain other elements (e.g., to allow for on-the-fly changes in mapping).

In some embodiments, the NDAP PDU header may be obligatory for each NAS PDU (NDAP SDU). However, it can be also allowed to skip NDAP PDU header whenever it is not needed for unique identification of NAS entity. The NDAP PDU header may be truncated by RAN before sending NAS PDU to CN. The NDAP PDU header may be added by RAN core once NAS PDU is received from CN. An example of 6-bits NSF ID only structure 1100 may be shown in FIG. 11A. As shown, there are two “R” bits 1102 and 1104 and the NSF ID 1106 occupies 6 bits.

In some embodiments, default NSF associated with default NAS entity may be defined. It is proposed to use such association whenever specific one is not defined. As an example, NSF ID=0 may be used for the default NSF. However, it can be also set to other value. One condition which needs to be fulfilled is such that default NSF ID is known to all interested parties i.e., UE, RAN and CN.

In the initial stage, a mapping between NAS entities and NSF IDs (e.g., which may also be considered as NAS services and NAS service type IDs) may be configured at RAN level by 6G. The mapping may be established not earlier than NAS security context is established. It implies that, in this solution, a default mapping between NAS messages and NSF in the initial stage (e.g., initial attach) may be used. That is, as long as mapping is not established (e.g., with NSF ID=0), the default NSF may be used. At this stage, all UL NAS PDUs (messages) will be sent to default NAS entity of CN. In addition, 6G RAN may expect that all DL NAS PDUs (messages) will be sent by default NAS entity in the initial stage.

In some embodiments, The NDAP PDUs' security may be ensured by using 6G RAN security context (NDAP PDU header ciphering/de-ciphering+integrity protection realized at 6G RAN PDCP layer). It means that the NDAP PDU header is un-ciphered at NDAP level.

As mentioned above, on-the-fly mapping modifications is allowed. Modifications may be done solely over NAS. Modifications are triggered by CN, only. Whenever CN wants to modify the mapping, the solution proposes to define DL NDAP PDU header in such a way that it allows to differentiate between NDAP PDU containing regular NAS message (not related to mapping change) from NAS message relate to mapping change. An example of 6-bits NSF ID and 1-byte NDAP PDU header structure 1110 may be shown in FIG. 11B. As shown, the NSF ID 1116 occupies 6 bits, the first bit ("D/C" field 1112) allows to differentiate.

Furthermore, to make it possible to confirm mapping change at UE side, UL NDAP PDU header may be modified in such a way that UE is able to announce using of new mapping starting from next NAS PDU. For example, a 6-bits NSF ID and 1-byte NDAP PDU header structure 1120 may be shown in FIG. 11C. As shown, the NSF ID 1126 occupies 6 bits, the first bit ("L" field 1112) allows to indicate that this is the last NAS PDU using old mapping.

Based on this solution, there are two types for NAS messaging, namely RRC-based NAS messaging and RRC-independent NAS messaging. For RRC-based NAS messaging, the NDAP PDUs are sent inside of RRC containers (either in NAS-dedicated messages or piggy-backed). It implies that, in this variant of the solution, as shown in FIG. 9A, the NDAP layer 902 co-operates directly with RRC 904. DL NDAP PDUs are propagated to RRC for transmission. UL NDAP PDUs are propagated to NDAP entity.

For the RRC-independent NAS messaging, the NDAP layer for NAS messaging which is handled outside of RRC may be used. When NAS PDUs are sent without using RRC containers. It means that they are sent using dedicated RB. In this case, it is proposed that NDAP layer, in addition to what has been described above, is responsible for managing the mapping between NSF and RB. It implies that, as shown in FIG. 9B, the NDAP layer 912 co-operates directly with PDCP layer 914. The NDAP entity is associated with PDCP entity and hence, DL NDAP PDUs are propagated to the right PDCP entity for transmission. UL NDAP PDUs are propagated to NDAP entity.

In addition, for C-Plane based NAS signaling (PDCP-S), dedicated SRBs are used for NAS messaging. For U-Plane based NAS signaling (PDCP-U), dedicated DRBs are used for NAS messaging. That is, the solution of the NAS message transport by introducing the new NDAP may also be combined with other solutions of the NAS message transport as mentioned above, for example, by configuring a mapping between NAS services and respective dedicated SRBs and/or DRBs.

Figure 12:
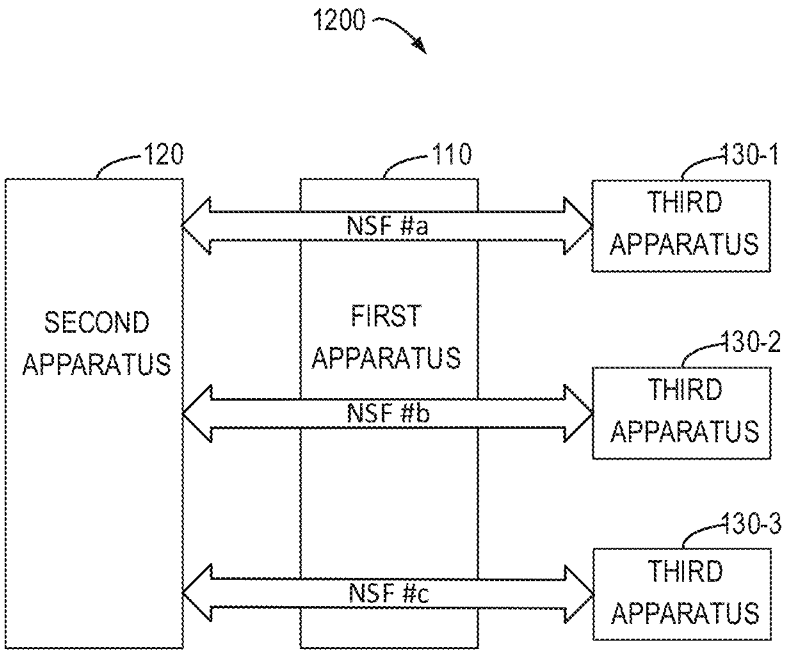
FIG. 12 illustrates a schematic diagram of example NAS service flows according to some example embodiments of the present disclosure.

FIG. 12 illustrates a schematic diagram of an example NAS message transport configuration 1200 according to some example embodiments of the present disclosure. In the example shown in FIG. 12, a mapping between the NAS entities and the NSF ID may be established. Based on the new NDAP layer and the mapping. The NAS messages associated with the NSF IDs #a, #b and #c may be transported between the second apparatus 120 and corresponding NAS entities (third apparatus 130-1 to 130-3) corresponding to the NSF IDs #a, #b and #c.

Moreover, depending on the RAN support, it's possible that one of the options is used for all the NAS services that a UE requires. For example, SRBx+NAS signaling connection for NAS-MM Service and SRBy+NAS signaling connection for Positioning service.

It is also possible that the different options can be used together. For example, in one option, RAN can configure a UE as follows, e.g., SRBx+NAS signaling connection for NAS-MM Service and DRBx+NAS signaling connection for Positioning service.

Based on the solutions of the present disclosure, a communication frame including distributed (or multiple) NAS terminations may be achieved. In this way, direct routing of NAS message to appropriate 6G NFs is enabled.

Figure 13:
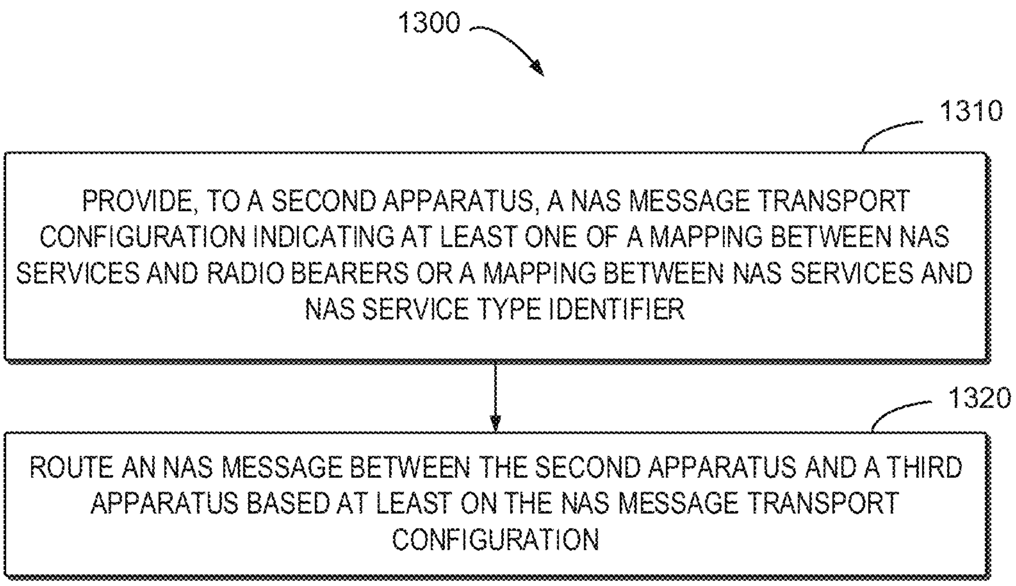
FIG. 13 illustrates a flowchart of a method implemented at a first apparatus according to some example embodiments of the present disclosure.

FIG. 13 shows a flowchart of an example method 1300 implemented at a first apparatus in accordance with some example embodiments of the present disclosure. For the purpose of discussion, the method 1300 will be described from the perspective of the first apparatus 110 in FIG. 1.

At block 1310, the first apparatus 110 provides, to a second apparatus, a NAS message transport configuration indicating at least one of a mapping between NAS services and radio bearers or a mapping between NAS services and NAS service type identifiers.

At block 1320, the first apparatus 110 routes an NAS message between the second apparatus and a third apparatus based at least on the NAS message transport configuration, wherein the third apparatus is determined from a plurality of apparatuses based on the NAS message transport configuration.

In some example embodiments, a mapping between NAS services and the radio bearers comprises at least one of the following: a mapping between the NAS services and respective dedicated signaling radio bearers, SRB, or a mapping between the NAS services and respective dedicated data radio bearers, DRBs.

In some example embodiments, different priorities are associated to the respective radio bearers.

In some example embodiments, the method 1300 further comprises: receiving, from the second apparatus, an indication of one or more NAS services to be required by the second apparatus; and configuring the at least one mapping based on the indication.

In some example embodiments, the method 1300 further comprises: transmitting, to the second apparatus, a request for the second apparatus to report the one or more NAS services to be required by the second apparatus.

In some example embodiments, the method 1300 further comprises: in response to receiving a downlink NAS message associated with a NAS service from the third apparatus, determining, based on the NAS message transport configuration, a dedicated SRB corresponding to the NAS service; and transmitting the downlink NAS message to the second apparatus via the determined dedicated SRB.

In some example embodiments, the method 1300 further comprises: in response to receiving an uplink NAS message via a dedicated SRB from the second apparatus, determining a NAS service corresponding to the dedicated SRB; and transmitting the uplink NAS message the third apparatus associated with the determined NAS service.

In some example embodiments, in a radio resource control, RRC, state, respective DRBs are mapped to corresponding F1-U tunnels, and wherein each of the corresponding F1-U tunnels is mapped to a NAS service.

In some example embodiments, the method 1300 further comprises: in response to receiving a downlink NAS message associated with a NAS service from the third apparatus, determining a F1-U tunnel corresponding to the NAS service; transmitting the downlink NAS message to the second apparatus via a dedicated DRB corresponding to the determined F1-U tunnel.

In some example embodiments, the method 1300 further comprises: in response to receiving an uplink NAS message via a dedicated DRB from the second apparatus, determining a F1-U tunnel corresponding to the dedicated SRB; and transmitting the uplink NAS message to the third apparatus associated with a NAS service corresponding to the determined F1-U tunnel.

In some example embodiments, the method 1300 further comprises: in response to receiving an uplink NAS message from the second apparatus, detecting, from the uplink NAS message, a NAS service type identifier of a NAS service; and transmitting the uplink NAS message to the third apparatus based on the NAS service type identifier.

In some example embodiments, the method 1300 further comprises: routing the NAS message between the second apparatus and the third apparatus based on a NAS data adaptation protocol, NDAP.

In some example embodiments, a NAS packet of the NAS message comprises a NDAP header and a payload of the NAS message, wherein a NAS service type identifier corresponding to the NAS service of the NAS message is indicated in the NDAP header.

In some example embodiments, the method 1300 further comprises: in response to receiving a NAS packet of the NAS message, determining the NAS service type identifier corresponding to the NAS service of the NAS message from the NDAP header of the NAS packet; and routing the NAS message to the third apparatus or the second apparatus corresponding to the NAS service type identifier.

In some example embodiments, the first apparatus comprises a radio access network device, the second apparatus comprises a NAS entity of a terminal device and the third apparatus comprises a NAS entity or a network function of a core network.

Figure 14:
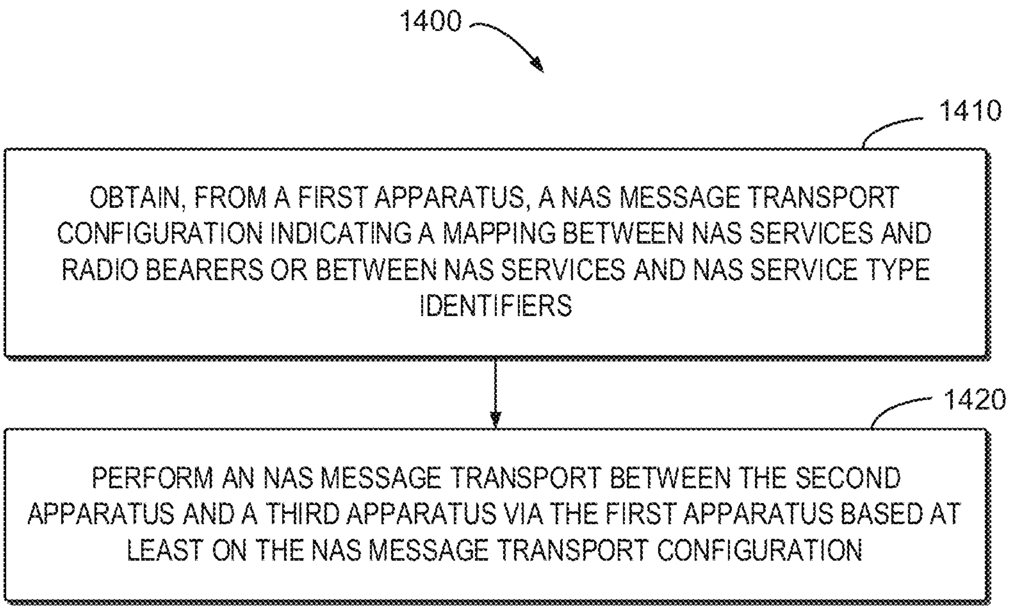
FIG. 14 illustrates a flowchart of a method implemented at a second apparatus according to some example embodiments of the present disclosure.

FIG. 14 shows a flowchart of an example method 1400 implemented at a second apparatus in accordance with some example embodiments of the present disclosure. For the purpose of discussion, the method 1400 will be described from the perspective of the second apparatus 120 in FIG. 1.

At block 1410, the second apparatus 120 obtains, from a first apparatus, a NAS message transport configuration indicating a mapping between NAS services and radio bearers or between NAS services and NAS service type identifiers.

At block 1420, the second apparatus 120 performs an NAS message transport between the second apparatus and a third apparatus via the first apparatus based at least on the NAS message transport configuration.

In some example embodiments, the method 1400 further comprises: transmitting, to the first apparatus, an indication of one or more NAS services to be required by the second apparatus, wherein the obtained NAS message transport configuration is based on the transmitted indication.

In some example embodiments, the method 1400 further comprises: receiving, from the first apparatus, a request for the second apparatus to report one or more NAS services to be required by the second apparatus.

In some example embodiments, a mapping between NAS services and the radio bearers comprises at least one of the following: a mapping between the NAS services and respective dedicated signaling radio bearers, SRB, or a mapping between the NAS services and respective dedicated data radio bearers, DRBs.

In some example embodiments, the method 1400 further comprises: transmitting the NAS message via one of: a dedicated SRB corresponding to a NAS service of the NAS message, or a dedicated DRB corresponding to a NAS service of the NAS message.

In some example embodiments, the method 1400 further comprises: transmitting the NAS message along with a NAS service type identifier corresponding to a NAS service of the NAS message.

In some example embodiments, the method 1400 further comprises: performing the NAS message transport between the second apparatus and the third apparatus via the first apparatus based on a NAS data adaptation protocol, NDAP.

In some example embodiments, a NAS packet of the NAS message comprises a NDAP header and a payload of the NAS message, wherein a NAS service type identifier corresponding to the NAS service of the NAS message is indicated in the NDAP header.

In some example embodiments, the first apparatus comprises a radio access network device, the second apparatus comprises a terminal device and the third apparatus comprises a NAS entity or a network function of a core network.

In some example embodiments, a first apparatus capable of performing any of the method 1300 (for example, the first apparatus 110 in FIG. 1 may comprise means for performing the respective operations of the method 1300. The means may be implemented in any suitable form. For example, the means may be implemented in a circuitry or software module. The first apparatus may be implemented as or included in the first apparatus 110 in FIG. 1.

In some example embodiments, the first apparatus comprises means for providing, to a second apparatus, a NAS message transport configuration indicating at least one of a mapping between NAS services and radio bearers or a mapping between NAS services and NAS service type identifiers; and means for routing an NAS message between the second apparatus and a third apparatus based at least on the NAS message transport configuration, wherein the third apparatus is determined from a plurality of apparatuses based on the NAS message transport configuration.

In some example embodiments, a mapping between NAS services and the radio bearers comprises at least one of the following: means for a mapping between the NAS services and respective dedicated signaling radio bearers, SRB, or means for a mapping between the NAS services and respective dedicated data radio bearers, DRBs.

In some example embodiments, different priorities are associated to the respective radio bearers.

In some example embodiments, the first apparatus further comprises: means for receiving, from the second apparatus, an indication of one or more NAS services to be required by the second apparatus; and means for configuring the at least one mapping based on the indication.

In some example embodiments, the first apparatus further comprises: means for transmitting, to the second apparatus, a request for the second apparatus to report the one or more NAS services to be required by the second apparatus.

In some example embodiments, the first apparatus further comprises: means for in response to receiving a downlink NAS message associated with a NAS service from the third apparatus, determining, based on the NAS message transport configuration, a dedicated SRB corresponding to the NAS service; and means for transmitting the downlink NAS message to the second apparatus via the determined dedicated SRB.

In some example embodiments, the first apparatus further comprises: means for in response to receiving an uplink NAS message via a dedicated SRB from the second apparatus, determining a NAS service corresponding to the dedicated SRB; and means for transmitting the uplink NAS message the third apparatus associated with the determined NAS service.

In some example embodiments, in a radio resource control, RRC, state, respective DRBs are mapped to corresponding F1-U tunnels, and wherein each of the corresponding F1-U tunnels is mapped to a NAS service.

In some example embodiments, the first apparatus further comprises: means for in response to receiving a downlink NAS message associated with a NAS service from the third apparatus, determining a F1-U tunnel corresponding to the NAS service; means for transmitting the downlink NAS message to the second apparatus via a dedicated DRB corresponding to the determined F1-U tunnel.

In some example embodiments, the first apparatus further comprises: means for in response to receiving an uplink NAS message via a dedicated DRB from the second apparatus, determining a F1-U tunnel corresponding to the dedicated SRB; and means for transmitting the uplink NAS message to the third apparatus associated with a NAS service corresponding to the determined F1-U tunnel.

In some example embodiments, the first apparatus further comprises: means for in response to receiving an uplink NAS message from the second apparatus, detecting, from the uplink NAS message, a NAS service type identifier of a NAS service; and means for transmitting the uplink NAS message to the third apparatus based on the NAS service type identifier.

In some example embodiments, the first apparatus further comprises: means for routing the NAS message between the second apparatus and the third apparatus based on a NAS data adaptation protocol, NDAP.

In some example embodiments, a NAS packet of the NAS message comprises a NDAP header and a payload of the NAS message, wherein a NAS service type identifier corresponding to the NAS service of the NAS message is indicated in the NDAP header.

In some example embodiments, the first apparatus further comprises: means for in response to receiving a NAS packet of the NAS message, determining the NAS service type identifier corresponding to the NAS service of the NAS message from the NDAP header of the NAS packet; and means for routing the NAS message to the third apparatus or the second apparatus corresponding to the NAS service type identifier.

In some example embodiments, the first apparatus comprises a radio access network device, the second apparatus comprises a NAS entity of a terminal device and the third apparatus comprises a NAS entity or a network function of a core network.

In some example embodiments, the first apparatus further comprises means for performing other operations in some example embodiments of the method 1300 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 1400 (for example, the second apparatus 120 in FIG. 1 may comprise means for performing the respective operations of the method 1400. The means may be implemented in any suitable form. For example, the means may be implemented in a circuitry or software module. The second apparatus may be implemented as or included in the second apparatus 120 in FIG. 1.

In some example embodiments, the second apparatus comprises means for obtaining, from a first apparatus, a NAS message transport configuration indicating a mapping between NAS services and radio bearers or between NAS services and NAS service type identifiers; and means for performing an NAS message transport between the second apparatus and a third apparatus via the first apparatus based at least on the NAS message transport configuration.

In some example embodiments, the second apparatus further comprises: means for transmitting, to the first apparatus, an indication of one or more NAS services to be required by the second apparatus, wherein the obtained NAS message transport configuration is based on the transmitted indication.

In some example embodiments, the second apparatus further comprises: means for receiving, from the first apparatus, a request for the second apparatus to report one or more NAS services to be required by the second apparatus.

In some example embodiments, a mapping between NAS services and the radio bearers comprises at least one of the following: means for a mapping between the NAS services and respective dedicated signaling radio bearers, SRB, or means for a mapping between the NAS services and respective dedicated data radio bearers, DRBs.

In some example embodiments, the second apparatus further comprises: means for transmitting the NAS message via one of: a dedicated SRB corresponding to a NAS service of the NAS message, or a dedicated DRB corresponding to a NAS service of the NAS message.

In some example embodiments, the second apparatus further comprises: means for transmitting the NAS message along with a NAS service type identifier corresponding to a NAS service of the NAS message.

In some example embodiments, the second apparatus further comprises: means for performing the NAS message transport between the second apparatus and the third apparatus via the first apparatus based on a NAS data adaptation protocol, NDAP.

In some example embodiments, a NAS packet of the NAS message comprises a NDAP header and a payload of the NAS message, wherein a NAS service type identifier corresponding to the NAS service of the NAS message is indicated in the NDAP header.

In some example embodiments, the first apparatus comprises a radio access network device, the second apparatus comprises a terminal device and the third apparatus comprises a NAS entity or a network function of a core network.

In some example embodiments, the second apparatus further comprises means for performing other operations in some example embodiments of the method 1400 or the second apparatus 120. In some example embodiments, the means comprises at least one processor; and at least one memory storing instructions that, when executed by the at least one processor, cause the performance of the second apparatus.

Figure 15:
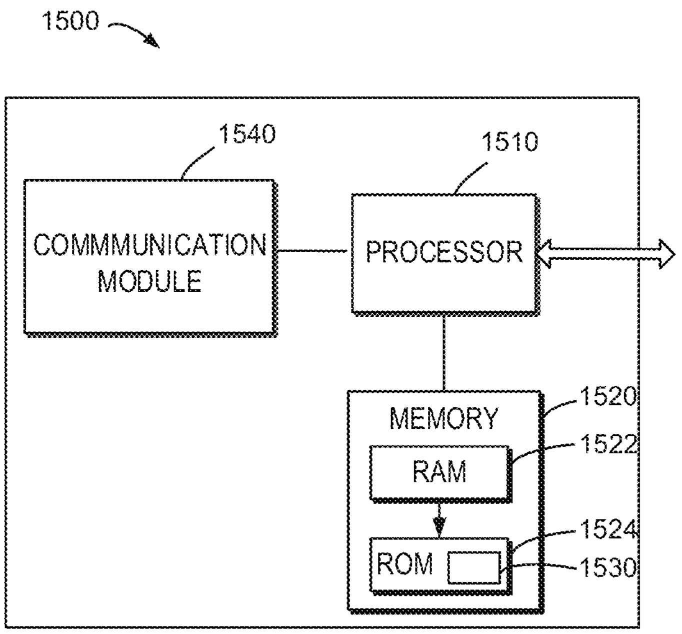
FIG. 15 illustrates a simplified block diagram of a device that is suitable for implementing example embodiments of the present disclosure.

FIG. 15 is a simplified block diagram of a device 1500 that is suitable for implementing example embodiments of the present disclosure. The device 1500 may be provided to implement a communication device, for example, the first apparatus 110 or the second apparatus 120 as shown in FIG. 1. As shown, the device 1500 includes one or more processors 1510, one or more memories 1520 coupled to the processor 1510, and one or more communication modules 1540 coupled to the processor 1510.

The communication module 1540 is for bidirectional communications. The communication module 1540 has one or more communication interfaces to facilitate communication with one or more other modules or devices. The communication interfaces may represent any interface that is necessary for communication with other network elements. In some example embodiments, the communication module 1540 may include at least one antenna.

The processor 1510 may be of any type suitable to the local technical network and may include one or more of the following: general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

The memory 1520 may include one or more non-volatile memories and one or more volatile memories. Examples of the non-volatile memories include, but are not limited to, a Read Only Memory (ROM) 1524, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1522 and other volatile memories that will not last in the power-down duration.

A computer program 1530 includes computer executable instructions that are executed by the associated processor 1510. The instructions of the program 1530 may include instructions for performing operations/acts of some example embodiments of the present disclosure. The program 1530 may be stored in the memory, e.g., the ROM 1524.

The processor 1510 may perform any suitable actions and processing by loading the program 1530 into the RAM 1522.

The example embodiments of the present disclosure may be implemented by means of the program 1530 so that the device 1500 may perform any process of the disclosure as discussed with reference to FIG. 2 to FIG. 14. The example embodiments of the present disclosure may also be implemented by hardware or by a combination of software and hardware.

In some example embodiments, the program 1530 may be tangibly contained in a computer readable medium which may be included in the device 1500 (such as in the memory 1520) or other storage devices that are accessible by the device 1500. The device 1500 may load the program 1530 from the computer readable medium to the RAM 1522 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 16:
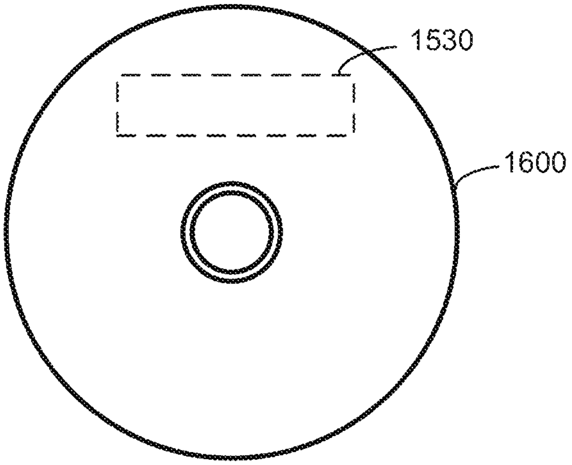
FIG. 16 illustrates a block diagram of an example computer readable medium in accordance with some example embodiments of the present disclosure.

FIG. 16 shows an example of the computer readable medium 1600 which may be in form of CD, DVD or other optical storage disk. The computer readable medium 1600 has the program 1530 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory storing instructions that, when executed by the at least one processor, cause the first apparatus at least to:

provide, to a second apparatus, a non-access stratum (NAS) message transport configuration indicating a mapping between NAS services and radio bearers and a mapping between the NAS services and NAS service type identifiers, wherein the mapping between the NAS services and the radio bearers comprises the following: a mapping between the NAS services and respective dedicated signaling radio bearers (SRBs), and a mapping between the NAS services and respective dedicated data radio bearers (DRBs), wherein in a radio resource control (RRC) state, respective DRBs are mapped to corresponding F1-U tunnels, and wherein each of the corresponding F1-U tunnels is mapped to a NAS service wherein different priorities are associated to the SRBs and the DRBs;

route an NAS message between the second apparatus and a third apparatus based at least on the NAS message transport configuration, wherein the third apparatus is determined from a plurality of apparatuses based on the NAS message transport configuration;

in response to receiving a first downlink NAS message associated with a first NAS service from the third apparatus, determine, based on the NAS message transport configuration, a dedicated SRB corresponding to the first NAS service;

transmit the first downlink NAS message to the second apparatus via the determined dedicated SRB;

in response to receiving an uplink NAS message via a dedicated SRB from the second apparatus, determine a second NAS service corresponding to the dedicated SRB;

transmit the uplink NAS message the third apparatus associated with the determined second NAS service;

in response to receiving a second downlink NAS message associated with a third NAS service from the third apparatus, determine a F1-U tunnel corresponding to the third NAS service;

transmit the second downlink NAS message to the second apparatus via a dedicated DRB corresponding to the determined F1-U tunnel;

in response to receiving a second uplink NAS message via a dedicated DRB from the second apparatus, determine a F1-U tunnel corresponding to the dedicated SRB; and transmit the second uplink NAS message to the third apparatus associated with a fourth NAS service corresponding to the determined F1-U tunnel.

2. The first apparatus of claim 1, wherein the first apparatus is caused to:

receive, from the second apparatus, an indication of one or more NAS services to be required by the second apparatus; and configure the at least one mapping based on the indication.

3. The first apparatus of claim 2, wherein the first apparatus is caused to:

transmit, to the second apparatus, a request for the second apparatus to report the one or more NAS services to be required by the second apparatus.

4. The first apparatus of claim 3, wherein the first apparatus is caused to:

in response to receiving a third uplink NAS message from the second apparatus, detect, from the third uplink NAS message, a NAS service type identifier of a NAS service; and transmit the third uplink NAS message to the third apparatus based on the NAS service type identifier.

5. The first apparatus of claim 4, wherein the first apparatus is caused to:

route the third uplink NAS message between the second apparatus and the third apparatus based on a NAS data adaptation protocol (NDAP).

6. The first apparatus of claim 5, wherein a NAS packet of the third uplink NAS message comprises a NDAP header and a payload of the third uplink NAS message, wherein a NAS service type identifier corresponding to the NAS service of the third uplink NAS message is indicated in the NDAP header.

7. The first apparatus of claim 6, wherein the first apparatus is caused to:

in response to receiving a NAS packet of the uplink NAS message, determine the NAS service type identifier corresponding to the NAS service of the uplink NAS message from the NDAP header of the NAS packet of the uplink NAS message; and route the uplink NAS message to the third apparatus or the second apparatus corresponding to the NAS service type identifier.

8. The first apparatus of claim 7, wherein the first apparatus comprises a radio access network device, the second apparatus comprises a NAS entity of a terminal device and the third apparatus comprises a NAS entity or a network function of a core network.

9. A system comprising:

a first apparatus;

at least one processor; and at least one memory storing instructions that, when executed by the at least one processor, cause the first apparatus at least to:

provide, to a second apparatus, a non-access stratum (NAS) message transport configuration indicating a mapping between NAS services and radio bearers and a mapping between the NAS services and NAS service type identifiers, wherein the mapping between the NAS services and the radio bearers comprises the following: a mapping between the NAS services and respective dedicated signaling radio bearers (SRBs), and a mapping between the NAS services and respective dedicated data radio bearers (DRBs), wherein in a radio resource control (RRC) state, respective DRBs are mapped to corresponding F1-U tunnels, and wherein each of the corresponding F1-U tunnels is mapped to a NAS service wherein different priorities are associated to the SRBs and the DRBs;

route an NAS message between the second apparatus and a third apparatus based at least on the NAS message transport configuration, wherein the third apparatus is determined from a plurality of apparatuses based on the NAS message transport configuration;

in response to receiving a first downlink NAS message associated with a first NAS service from the third apparatus, determine, based on the NAS message transport configuration, a dedicated SRB corresponding to the first NAS service;

transmit the first downlink NAS message to the second apparatus via the determined dedicated SRB;

in response to receiving an uplink NAS message via a dedicated SRB from the second apparatus, determine a second NAS service corresponding to the dedicated SRB;

transmit the uplink NAS message the third apparatus associated with the determined second NAS service;

in response to receiving a second downlink NAS message associated with a third NAS service from the third apparatus, determine a F1-U tunnel corresponding to the third NAS service;

transmit the second downlink NAS message to the second apparatus via a dedicated DRB corresponding to the determined F1-U tunnel;

in response to receiving a second uplink NAS message via a dedicated DRB from the second apparatus, determine a F1-U tunnel corresponding to the dedicated SRB; and transmit the second uplink NAS message to the third apparatus associated with a fourth NAS service corresponding to the determined F1-U tunnel.

10. The system of claim 9, wherein the first apparatus is caused to:

receive, from the second apparatus, an indication of one or more NAS services to be required by the second apparatus; and configure the at least one mapping based on the indication.

11. The system of claim 10, wherein the first apparatus is caused to:

transmit, to the second apparatus, a request for the second apparatus to report the one or more NAS services to be required by the second apparatus.

12. The system of claim 11, wherein the first apparatus is caused to:

in response to receiving a third uplink NAS message from the second apparatus, detect, from the third uplink NAS message, a NAS service type identifier of a NAS service; and transmit the third uplink NAS message to the third apparatus based on the NAS service type identifier.

13. The system of claim 12, wherein the first apparatus is caused to:

route the third uplink NAS message between the second apparatus and the third apparatus based on a NAS data adaptation protocol (NDAP).

14. The system of claim 13, wherein a NAS packet of the third uplink NAS message comprises a NDAP header and a payload of the third uplink NAS message, wherein a NAS service type identifier corresponding to the NAS service of the third uplink NAS message is indicated in the NDAP header.

15. The system of claim 14, wherein the first apparatus is caused to:

in response to receiving a NAS packet of the uplink NAS message, determine the NAS service type identifier corresponding to the NAS service of the uplink NAS message from the NDAP header of the NAS packet of the uplink NAS message; and route the uplink NAS message to the third apparatus or the second apparatus corresponding to the NAS service type identifier.

16. The system of claim 15, wherein the first apparatus comprises a radio access network device, the second apparatus comprises a NAS entity of a terminal device and the third apparatus comprises a NAS entity or a network function of a core network.

17. A method comprising:

providing, by a first apparatus to a second apparatus, a non-access stratum (NAS) message transport configuration indicating a mapping between NAS services and radio bearers and a mapping between the NAS services and NAS service type identifiers, wherein the mapping between the NAS services and the radio bearers comprises the following: a mapping between the NAS services and respective dedicated signaling radio bearers (SRBs), and a mapping between the NAS services and respective dedicated data radio bearers (DRBs), wherein in a radio resource control (RRC) state, respective DRBs are mapped to corresponding F1-U tunnels, and wherein each of the corresponding F1-U tunnels is mapped to a NAS service wherein different priorities are associated to the SRBs and the DRBs;

routing, by the first apparatus, an NAS message between the second apparatus and a third apparatus based at least on the NAS message transport configuration, wherein the third apparatus is determined from a plurality of apparatuses based on the NAS message transport configuration;

in response to receiving a first downlink NAS message associated with a first NAS service from the third apparatus, determining, by the first apparatus, based on the NAS message transport configuration, a dedicated SRB corresponding to the first NAS service;

transmitting, by the first apparatus, the first downlink NAS message to the second apparatus via the determined dedicated SRB;

in response to receiving an uplink NAS message via a dedicated SRB from the second apparatus, determining, by the first apparatus, a second NAS service corresponding to the dedicated SRB;

transmitting, by the first apparatus, the uplink NAS message the third apparatus associated with the determined second NAS service;

in response to receiving a second downlink NAS message associated with a third NAS service from the third apparatus, determining, by the first apparatus, a F1-U tunnel corresponding to the third NAS service;

transmitting, by the first apparatus, the second downlink NAS message to the second apparatus via a dedicated DRB corresponding to the determined F1-U tunnel;

in response to receiving a second uplink NAS message via a dedicated DRB from the second apparatus, determining, by the first apparatus, a F1-U tunnel corresponding to the dedicated SRB; and transmitting, by the first apparatus, the second uplink NAS message to the third apparatus associated with a fourth NAS service corresponding to the determined F1-U tunnel.

18. The method of claim 17, further comprising:

receiving, by the first apparatus from the second apparatus, an indication of one or more NAS services to be required by the second apparatus; and configuring, by the first apparatus, the at least one mapping based on the indication.

19. The method of claim 18, further comprising:

transmitting, by the first apparatus to the second apparatus, a request for the second apparatus to report the one or more NAS services to be required by the second apparatus.

20. The method of claim 19, further comprising:

in response to receiving a third uplink NAS message from the second apparatus, detecting, by the first apparatus from the third uplink NAS message, a NAS service type identifier of a NAS service;

transmitting, by the first apparatus, the third uplink NAS message to the third apparatus based on the NAS service type identifier;

routing, by the first apparatus, the third uplink NAS message between the second apparatus and the third apparatus based on a NAS data adaptation protocol (NDAP), wherein a NAS packet of the third uplink NAS message comprises a NDAP header and a payload of the third uplink NAS message, wherein a NAS service type identifier corresponding to the NAS service of the third uplink NAS message is indicated in the NDAP header;

in response to receiving a NAS packet of the uplink NAS message, determining, by the first apparatus, the NAS service type identifier corresponding to the NAS service of the uplink NAS message from the NDAP header of the NAS packet of the uplink NAS message; and routing, by the first apparatus, the uplink NAS message to the third apparatus or the second apparatus corresponding to the NAS service type identifier.

* * * * *